3,734,786
SOLID PROPELLANTS FABRICATED FROM A MIXED POLYMER SYSTEM
Ernest J. Walden, Mountain View, and John W. Allan, Menlo Park, Calif., assignors to United Aircraft Corporation, East Hartford, Conn.
Filed Feb. 16, 1971, Ser. No. 115,515
Int. Cl. C06d 5/06
U.S. Cl. 149—19    4 Claims

ABSTRACT OF THE DISCLOSURE

Functionally terminated polyisobutylene and functionally terminated polybutadiene are not completely soluble in each other at room temperature and lower. Nevertheless, it has been discovered that the insoluble mixtures of these materials can be crosslinked to form a homogeneous binder network which is particularly useful in the manufacture of composite solid propellants.

BACKGROUND OF THE INVENTION

Functionally terminated polymers having a saturated backbone of the following general structural formula:

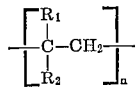

wherein $R_1$ and $R_2$ are lower alkyl groups containing from 1 to 10 carbon atoms are known to the art (see, for example, U.S. Pat. 3,427,351) and have been found to be particularly useful in preparing solid propellants since the propellants formed therefrom exhibit particularly useful characteristics with respect to oxidative resistance, low burning rate, constant burning rate pressure exponent up to relatively high pressures and the absence of unstable burning in nonaluminized propellant formulations. In view of the saturated nature of the backbone structure of these polymers, however, the cured networks tend to exhibit relatively poor mechanical properties particularly at temperatures below about —40° F. On the other hand, functionally terminated unsaturated polymers such as the polybutadiene polymers have long been utilized in the preparation of solid propellant compositions and the propellants formed therefrom have excellent mechanical properties at low temperatures. However, these materials have known disadvantages particularly with respect to oxidative resistance and unstable burning of nonaluminized smokeless propellants. We have found that when functionally terminated saturated polymers are mixed with functionally terminated unsaturated polymers, the materials are not completely miscible and cloudy mixtures are obtained. In spite of the apparent insolubility of the materials, we have unexpectedly found that mixtures of these materials may be crosslinked to produce uniform homogeneous binders. In addition, we have found that in various proportions, the materials permit a binder to be obtained which exhibits the best features of both the saturated and the unsaturated polymer systems and in some cases better than are obtained by either of the systems individually.

It is accordingly an object of this invention to provide a crosslinkable polymer system consisting of functionally terminated unsaturated polymers and functionally terminated saturated polymers.

It is another object of this invention to manufacture a solid propellant from such a polymer mixture.

Figure 1:
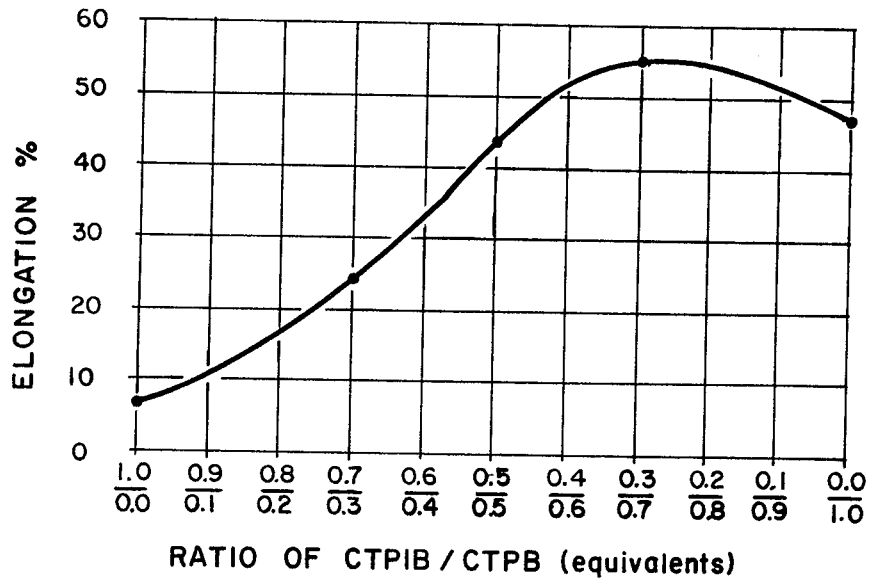
Figure 2:
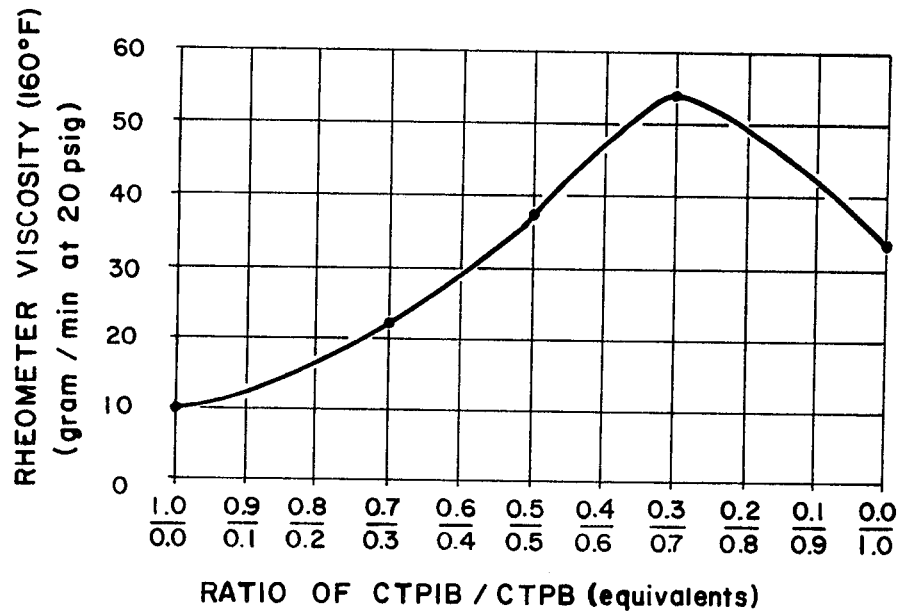
Figure 3:
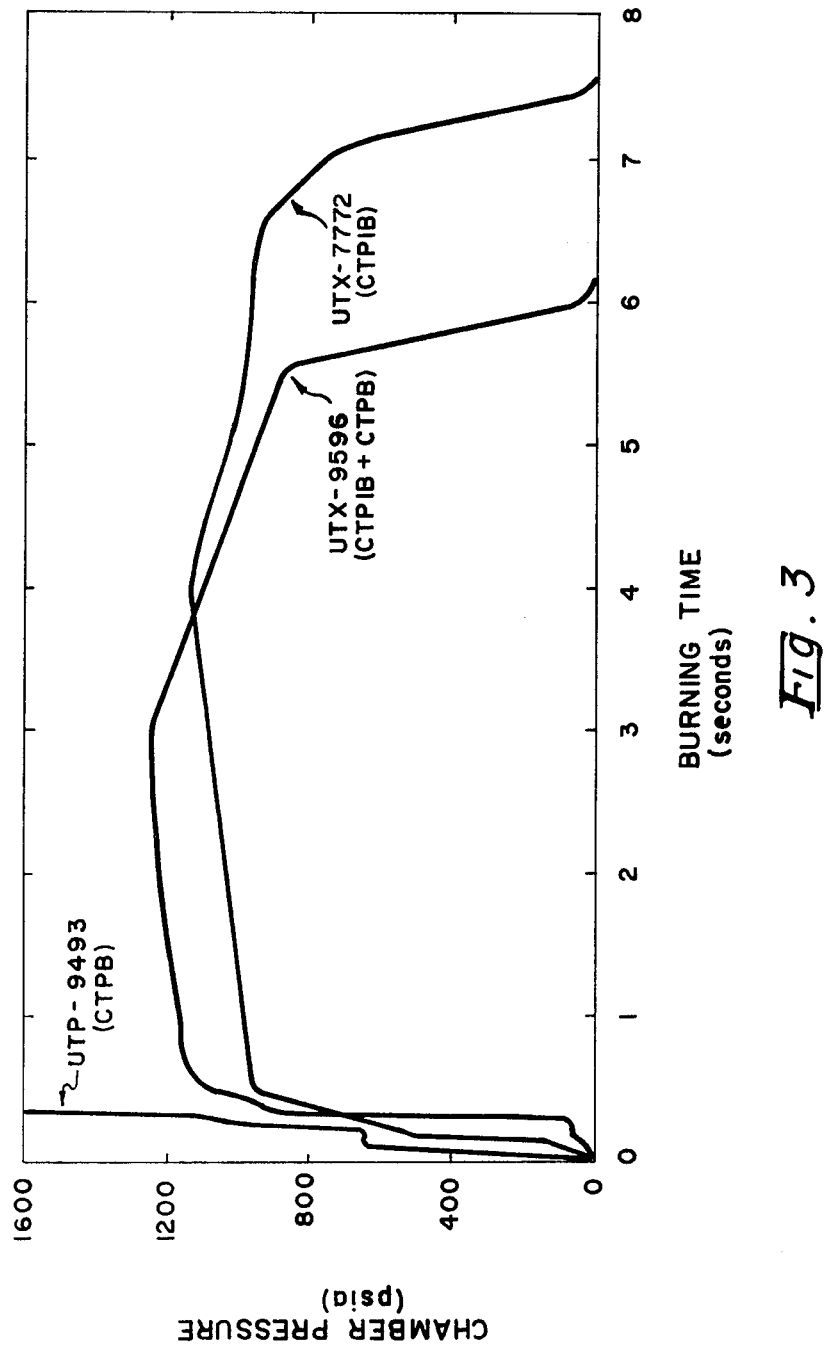

These and other objects of the invention will be readily apparent from the following description with reference to the accompanying drawings wherein:

FIG. 1 is a plot of the low temperature elongation of crosslinked polymers comparing the properties of the mixed polymers of this invention with the pure individual polymers, FIG. 2 is a plot showing the viscosity of mixed polymer propellants at several polymer ratios, and FIG. 3 is a plot showing pressure versus time traces for propellants fabricated from the prior art polymers and the polymers of this invention.

DESCRIPTION OF THE INVENTION

It has been found that even though certain functionally terminated saturated polymers are not miscible with the corresponding functionally terminated unsaturated polymers, mixtures of these materials may be crosslinked to produce uniform rubbery polymers, particularly suitable for use in making solid propellants. Not only is the ability to form a rubbery polymer unexpected from the apparent insolubility of these materials, but the cured products are capable of producing propellants which have better low temperature properties than an all saturated system, and in certain properties better than an all polybutadiene system; have lower inherent burning rates than the polybutadiene systems; lower susceptibility to unstable burning than the polybutadiene systems; and lower susceptibility to pressure exponent increases at higher pressures than an all polybutadiene system. In addition, more curing agents and plasticizers are available for the mixed polymer systems than for the all saturated system alone; and further, in carboxy-terminated systems, the viscosity of the mixed polymer system is substantially lower than that of the all saturated system thus permitting a greater solids loading to be obtained. The saturated polymers usable according to this invention include those carboxy-terminated polymers described in U.S. Pat. No. 3,427,351, Nakagawa and Rudy, as well as polymers having other terminal functional groups including, for example, the hydroxy-terminal and epoxy-terminal groups. This invention is applicable with saturated polymers having the following structural formula:

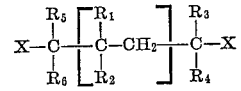

wherein X is a crosslinkable functional group of which carboxy, hydroxy, and epoxy groups are representative, $R_1$ and $R_2$ are lower alkyl groups containing from 1–10 carbon atoms, and $R_3$, $R_4$ $R_5$, and $R_6$ are hydrogen or lower alkyl groups containing from 1–10 carbon atoms. For ease of description, the invention will hereinafter be described with respect to the polyisobutylene system since this is the preferred system in the propellant art; however, it should be recognized that the principles of this invention are to be construed as being applicable to all members of this generic class.

Suitable polybutadiene polymers are also known to the art and exist in various functionally terminated groups including their carboxy, hydroxy, and epoxy form. In the description of this invention, it should be recognized that when mixed polymers are employed both the saturated component and the unsaturated component should have similar functional groups to permit the use of a single cure system to crosslink both members. For example, if carboxy-functional polyisobutylene is the saturated material, the carboxy-functional polybutadiene should be the unsaturated component.

The following examples will illustrate the advantages obtained by this invention. In these Examples I–III the saturated polymer was UTREZ, a carboxy-terminated polyisobutylene (CTPIB) having an equivalent weight of approximately 950 available from United Technology Center and the unsaturated polymer was a carboxy-terminated polybutadiene (CTPB) having an equivalent weight of approximately 1,900.

EXAMPLE I

Mixtures of CTPIB and CTPB in the following proportion by equivalents of CTPIB to CTPB were prepared: 0.7/0.3, 0.5/0.5, and 0.3/0.7. All of these mixtures produced a cloudy liquid dispersion indicating incomplete solubility of the materials in each other. Solid propellants containing 84% solids made from these mixtures were cured with 0.5 equivalents of a trifunctional epoxide, EPON X–801 and 0.8 equivalent of a trifunctional aziridine, MAPO, cured at 160° F. for seven days. The materials were cooled to —50° F. and the elongation was measured. FIG. 1 compares the results obtained with these materials with the results obtained using pure carboxy-terminated polyisobutylene and carboxy-terminated polybutadiene, cured with the same curing agents as the binders. As can be seen from FIG. 1, the presence of some polybutadiene substantially increased the low temperature elongation of the polymer prior to breakage and in the range above approximately 0.4/0.6 CTPIB/CTPB ratio; the low temperature elongation was actually superior to the pure polybutadiene system itself.

EXAMPLE II

The viscosities of the uncured propellant system of Example I were compared to pure carboxy-terminated polyisobutylene and pure carboxy-terminated polybutadiene propellant systems and the results are plotted in FIG. 2. As can be seen the mixed polymer systems have exhibited a desirable increase in flow rate (reduction in viscosity) from that exhibited by the pure carboxy-terminated polyisobutylene and a substantial range of mixed polymers even exhibit a lower viscosity than pure polybutadiene itself. This lower viscosity substantially enhances the processability of castable solid propellant mixes and with lower viscosity binders permitting the attainment of higher solids loadings in the mix itself.

EXAMPLE III

A non-aluminized smokeless solid propellant using ammonium perchlorate oxidizer was produced from an 0.5/0.5 mixture of CTPIB/CTPB as well as from pure CTPIB and pure CTPB. These propellants employing a trifunctional epoxide and a trifunctional aziridine as curing agents were cast into solid propellant rocket motors and cured at 160° F. for seven days. The rocket motors were designed to produce a 1100 p.s.i.a. chamber pressure and the pressure time traces resulting from the firings are shown in FIG. 3. As can be seen the pure polybutadiene system exhibited an unstable ignition sequence which resulted in an immediate overpressurization and failure of the rocket motor. The 0.5/0.5 system, however, completely eliminated the combustion instability and produced a burning trace essentially similar to that of the pure carboxy-terminated polyisobutylene itself.

While the above examples have been directed to showing that certain desirable physical properties and combustion characteristics can be obtained by use of the mixed polymer systems, other advantages are also obtained. For example, pure polyisobutylene systems have limited solubility for many commercially available curatives and plasticizers. Thus, when a carboxy-terminated polyisobutylene system is employed, it is necessary either to resort to an expensive aziridinyl cure system or to develop specific trifunctional epoxy curing agents which are soluble in the polyisobutylene. However, when a mixed polymer system is employed with amounts as low as approximately 0.1 equivalents of polybutadiene, commercially available curatives and plasticizers such as EPON 812, ERL 0510, dioctyl adipate, isodecylpelargonate can be employed satisfactorily. Similar properties can be obtained with functional groups other than the carboxy.

EXAMPLE IV

Samples of hydroxy - terminated polyisobutylene [1] (HTPIB) and hydroxy - terminated polybutadiene [2] (HTPB) in HTPIB/HTPB equivalents ratios of 50/50 and 25/75 were cured with one equivalent of dimeryl diisocyanate at both 140° F. and 170° F. All uncured samples exhibited evidence of immiscibility yet cured to produce clear gumstocks.

As can be seen from the above discussion, the applicants have discovered that mixed functionally terminated polymer systems of saturated and unsaturated polymers can be satisfactorily cured even though relatively insoluble. This discovery substantially enhances the degree of design flexibility available in the rocket propulsion art. Thus, if low viscosity or enhanced elongation are required, the designer could select high proportions of unsaturated material whereas if only an increased availability of potential curing agents for the mixture is desired, systems with high proportions of saturated material would be selected.

Any of the known oxidizers used in the solid propellant art such as ammonium perchlorate, ammonium nitrate, potassium perchlorate, potassium nitrate, hydroxylamine perchlorate, for example, can be used with this invention as can the conventional additives and combustion catalysts such as iron oxides, ferrocene compounds, for example. Various modifications may be made by workers skilled in the art without departing from the scope of this invention which is limited only by the following claims wherein:

[1] Utrezdiol—United Technology Center.
[2] R–45 Arco Chemical Company.

We claim:

1. A crosslinkable composition of matter comprising a mixture of first and second functionally terminated hydrocarbon polymeric components said first component having a saturated backbone structure and said second component having an unsaturated backbone structure, the terminal functional groups of said first and second components being the same and being selected from the group consisting of carboxy, hydroxy and epoxy functional groups, a crosslinking agent for said terminal functional groups and a particulate inorganic oxidizing agent.

2. The composition of claim 1 wherein said saturated polymer is a functionally terminated polyisobutylene and said unsaturated polymer is a functionally terminated polybutadiene.

3. The composition of claim 1 wherein the ratio of equivalents of saturated polymer to unsaturated polymer is in the range between approximately 0.4/0.6 and 0.0/1.0.

4. The composition of claim 2 wherein the ratio of equivalents of saturated polymer to unsaturated polymer is in the range between approximately 0.4/0.6 and 0.0/1.0.

References Cited

UNITED STATES PATENTS

| | | | |
|---|---|---|---|
| 3,305,523 | 2/1967 | Burnside | 149—19 X |
| 3,577,289 | 5/1971 | Morrell | 149—19 |
| 3,427,351 | 2/1969 | Nakagawa et al. | 260—537 |
| 3,245,850 | 4/1966 | Harbert | 149—19 |
| 3,424,630 | 1/1969 | Corley | 149—19 |
| 3,586,552 | 6/1971 | Potts et al. | 149—19 |
| 3,657,206 | 4/1972 | Halasa | 260—82.1 |

BENJAMIN R. PADGETT, Primary Examiner

E. A. MILLER, Assistant Examiner

U.S. Cl. X.R.

149—20, 76